(12) United States Patent
Cruz (10) Patent No.: US 9,145,158 B2
(45) Date of Patent: *Sep. 29, 2015

(54) TABLET COMPUTER HOLDER

(71) Applicant: Luis Cruz, Newport, RI (US)

(72) Inventor: Luis Cruz, Newport, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/562,938

(22) Filed: Dec. 8, 2014

(65) Prior Publication Data

US 2015/0108317 A1  Apr. 23, 2015

Related U.S. Application Data

(63) Continuation-in-part of application No. 13/910,571, filed on Jun. 5, 2013.

(60) Provisional application No. 61/721,578, filed on Nov. 2, 2012.

(51) Int. Cl.
| | | |
|---|---|---|
| *B60R 7/00* | (2006.01) |
| *B62B 1/00* | (2006.01) |
| *B62B 3/00* | (2006.01) |
| *B62B 5/00* | (2006.01) |
| *B62B 7/00* | (2006.01) |
| *B62B 9/00* | (2006.01) |
| *B62B 9/26* | (2006.01) |
| *A47C 7/72* | (2006.01) |
| *F16M 13/02* | (2006.01) |

(52) U.S. Cl.
CPC ... *B62B 9/26* (2013.01); *A47C 7/72* (2013.01); *F16M 13/022* (2013.01)

(58) Field of Classification Search
CPC ........................................... F16M 13/00
USPC .................. 224/409, 400; 280/642, 647, 650
See application file for complete search history.

(56) References Cited

U.S. PATENT DOCUMENTS

| | | | |
|---|---|---|---|
| 6,857,839 B2 * | 2/2005 | Pitoniak ..................... 414/462 |
| 8,020,829 B1 * | 9/2011 | Tamayori .................. 248/447.2 |
| 8,365,969 B2 * | 2/2013 | Johnson ...................... 224/413 |
| 8,382,059 B2 | 2/2013 | Le Gette et al. |
| 8,567,866 B2 * | 10/2013 | Carimati Di Carimate et al. ........................ 297/378.1 |
| 8,978,947 B1 * | 3/2015 | Schneidau et al. ........... 224/409 |
| 2006/0113342 A1 * | 6/2006 | Hampton et al. ............ 224/409 |
| 2009/0179394 A1 * | 7/2009 | Huber et al. ............... 280/47.38 |
| 2011/0233251 A1 * | 9/2011 | Doig ............................ 224/567 |
| 2011/0284604 A1 * | 11/2011 | Conrad et al. ............... 224/409 |
| 2012/0118929 A1 | 5/2012 | Chuah |
| 2012/0168481 A1 * | 7/2012 | Casagrande ................. 224/556 |
| 2012/0205412 A1 * | 8/2012 | Choi ........................... 224/483 |
| 2012/0285907 A1 | 11/2012 | Emmons |
| 2014/0124553 A1 * | 5/2014 | Cruz ........................... 224/409 |

* cited by examiner

*Primary Examiner* — Brian D Nash
*Assistant Examiner* — Derek Battisti
(74) *Attorney, Agent, or Firm* — Lambert & Associates; Gary E. Lambert; David J. Connaughton, Jr.

(57) ABSTRACT

The present disclosure concerns a tablet holder securing a tablet to a stroller, chair, table, or the like. The tablet holder involves a multiple adjustable mechanisms to accommodate different size of the tablet and viewing angles. The tablet holder provides a secure platform for the user to interact with the tablet, and it is conveniently foldable and can be disassembled while not in use.

1 Claim, 11 Drawing Sheets

TABLET COMPUTER HOLDER

CROSS-REFERENCE TO RELATED APPLICATIONS

This application is a continuation-in-part application claiming priority to non-provisional patent application Ser. No. 13/910,571 filed on Jun. 5, 2013, which in turn claims the benefit to Provisional Application No. 61/721,578 filed on Nov. 2, 2012.

BACKGROUND OF THE INVENTION

1. Field of the Invention

The present invention relates in general to a tablet holder. More particularly, the holder of the present invention is particularly adapted for use with a stroller, carriage or other mobile apparatus.

2. Description of Related Art

There are a variety of different electronic tablets and the like that may be used by people of all ages. This includes instructional computers or tablets for young children. These typically are used in a stationary manner and for educational purposes.

One of the advantages of using such electronic tablets is its mobility. Electronic tablets are built to be light and easily accessible for using them while traveling. Electronic tablets can provide an entertaining or educational use for children when parents are traveling with them. Such use of electronic tablets can be very helpful when parents need their children to be occupied while attending to other matters. However, using electronic tablets while traveling increases the chance of damaging them which commonly occurs due to unforeseen accidents. When electronic tablets are operated by children while traveling, the chance of damaging them is even higher.

While there are many holsters for electronic tablets exist to protect the electronic tablets from being damaged in case of an accidental drop or the like, such holsters do not provide a stable platform to hold the electronic tablets in place while a child interacts with them.

Therefore, a need exists for a tablet holder that can be mounted to a stroller to prevent damages that may occur to electronic tablets when a child operates them while in motion. A need also exists for a tablet holder that can be easily adjustable while providing a stable platform.

SUMMARY OF THE INVENTION

The subject matter of this application may involve, in some cases, interrelated products, alternative solutions to a particular problem, and/or a plurality of different uses of a single system or article.

An object of the present invention is to provide such a tablet associated with a stroller, carriage or other mobile apparatus.

In accordance with the present invention, there is provided a detachable tablet holder that may be removably attached to a stroller, carriage or the like mobile apparatus and which is provided with a number of different adjustments. In this way, a viewing screen of the tablet can be disposed at a convenient location for viewing by the child, particularly while the child is seated within the stroller. When not in use, the tablet holder may be removed from the stroller in a relatively simple manner leaving a portion of the device attached to the stroller and pivotal on either side of the seat of the stroller. The tablet holder may be pivoted between a stowed or rest position and a usable position.

In one aspect, a detachable tablet holder for a stroller is provided. The detachable tablet holder may comprise a support frame, a plate member, a plurality of upright legs, a platform, and a plurality of support legs. The support frame may be configured to receive the tablet and hold it within the support frame. A locking lever is formed at a back of the support frame placing the support frame in a fixed position when the locking lever is engaged.

A plate member may be pivotally mounted at the back of the support frame where a securing knob may be placed to tighten the support frame and the plate member in place. A plurality of upright legs may be pivotally attached at a bottom of the plate member. The plurality of upright legs may share a pivot axis extending perpendicular to each of the plurality of upright legs. Such pivot connections among the support frame, the plate member, and the plurality of upright legs allow the tablet therein to be adjustable.

A platform may provide a flat surface where the plurality of uprights legs may be affixed. The platform may have a plurality of support legs extending downwardly therefrom. Each of the plurality of support legs may be extendable and/or retractable along their length, allowing height adjustment of the platform. Finally, the plurality of support legs may be pivotally attached to the stroller.

In another aspect, a stroller receiving the detachable tablet holder is provided. The stroller may comprise a handle at a top of the holder enabling it to be maneuvered. A plurality of rails may extend at an angle towards a bottom of the stroller where the plurality of support legs may be pivotally attached. The stroller may comprise a seated area where a child may be placed. The detachable tablet holder may be adjustable to a convenient location for viewing by the child placed in the seated area.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Figure 1:
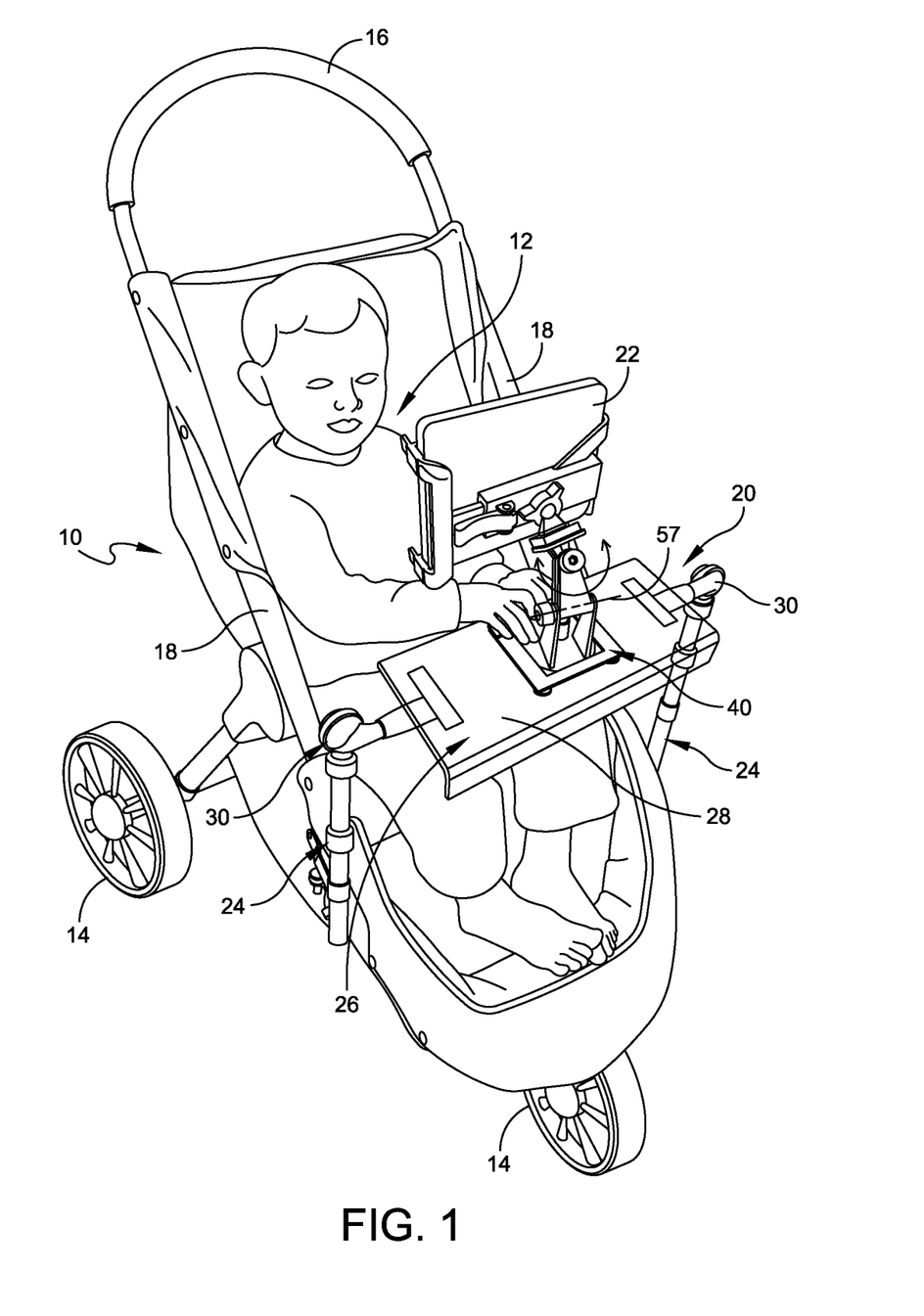
FIG. 1 is a perspective view of the tablet display holder as mounted on a children's stroller.
Figure 6:
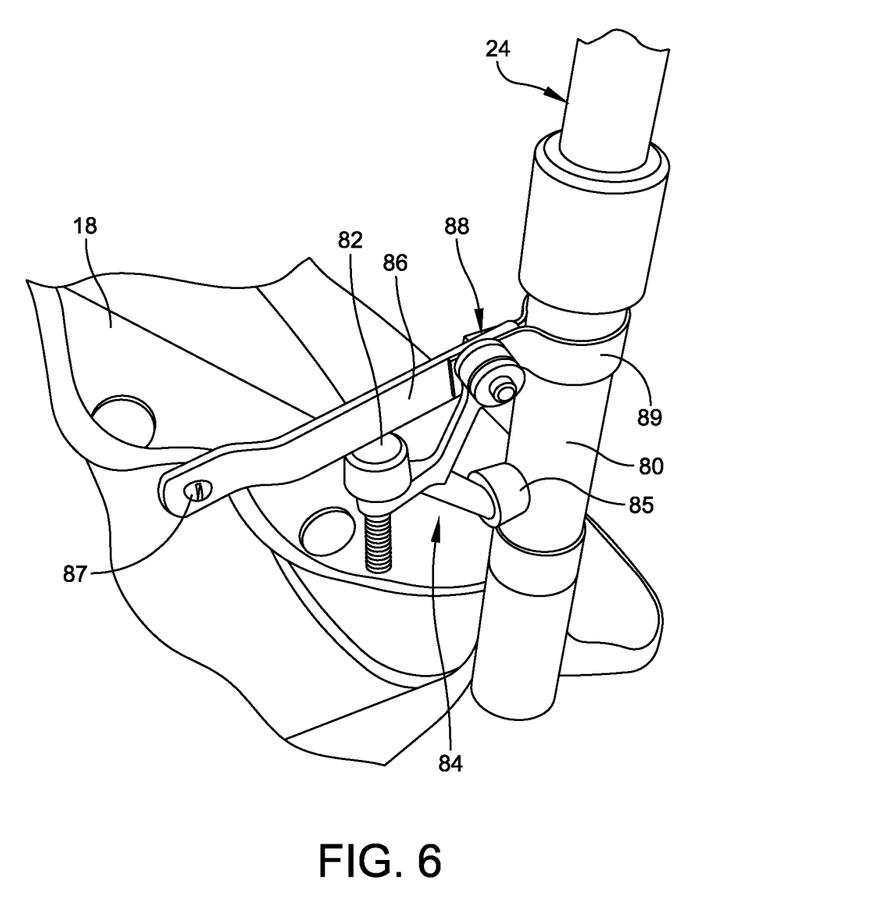
FIG. 6 is a perspective view showing further details of the portion of the apparatus that remains attached to the stroller but that is pivotal relative to the stroller.
Figure 7:
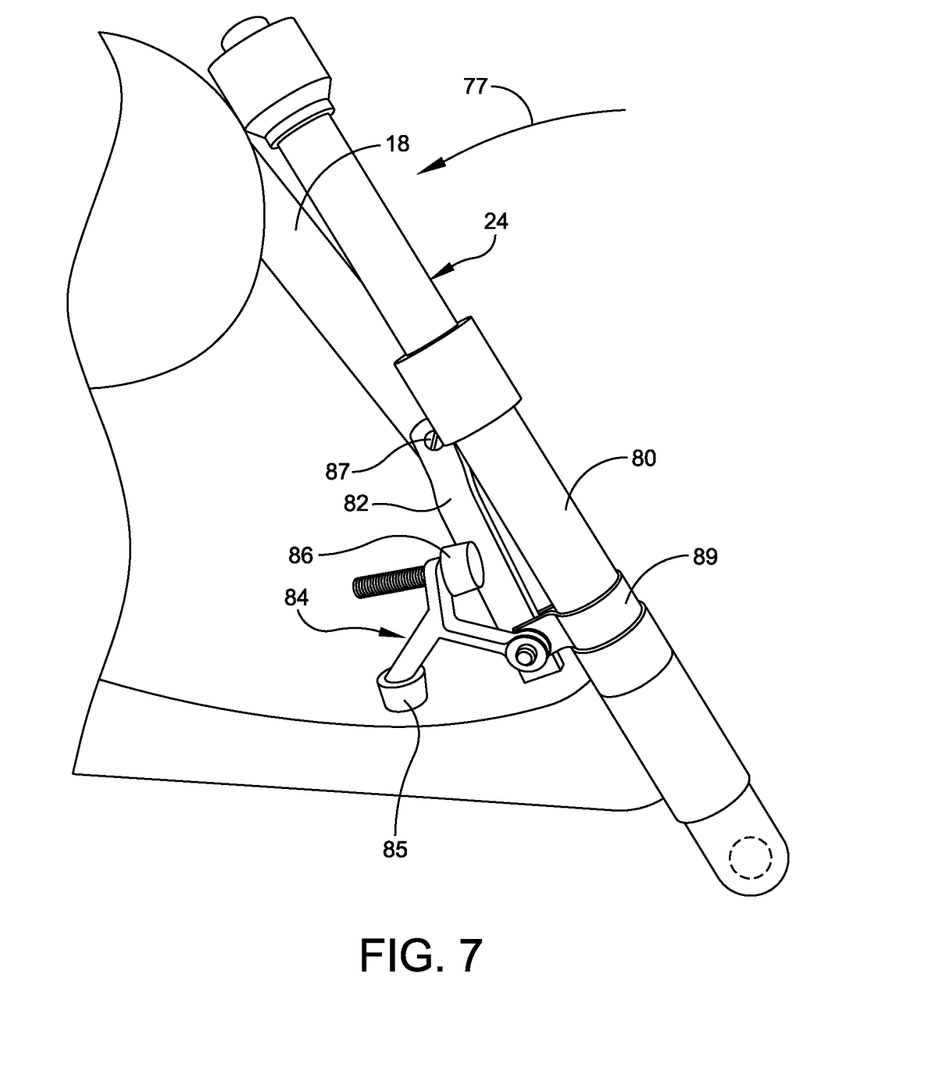
FIG. 7 illustrates the stroller attached portion of the support apparatus in a stowed position.

Reference is now made to the perspective view of FIG. 1 that illustrates, what may be considered a conventional stroller at 10. The stroller 10 has a seated area. In FIG. 1 the child is illustrated in the seated area at 12. The stroller typically also includes a support wheels 14 and a handle 16. As a variety of different types of strollers may be used with the apparatus of the present invention, the construction of the stroller itself is not discussed herein in any great detail. The stroller may be one that does not fold up or it may be a stroller of the folding-up type. FIG. 1 also shows opposite side rails 18 that extend from the handle 16 to the bottom of the stroller 10. FIGS. 6 and 7 illustrate a portion of the apparatus of the present invention attached at the very base of the support rails 18.

The tablet contemplated herein may include, but is not limited to mobile computers, tablet computers, laptops, handheld computers, smart phones, electronic readers, and similar display device.

FIG. 1 also illustrates the novel apparatus of the present invention at 20 which supports a tablet 22 in proper viewing position to a child. This may also enable the child to interact with the tablet 22 depending upon the particular tablet construction.

In FIG. 1 a detachable tablet holder 20 may be considered as comprised of support legs 24 that is pivotally attached at the base of the rails 18, on the left and right of the stroller, and a removable portion 26 that is for the main support of the tablet 22.

Figure 2:
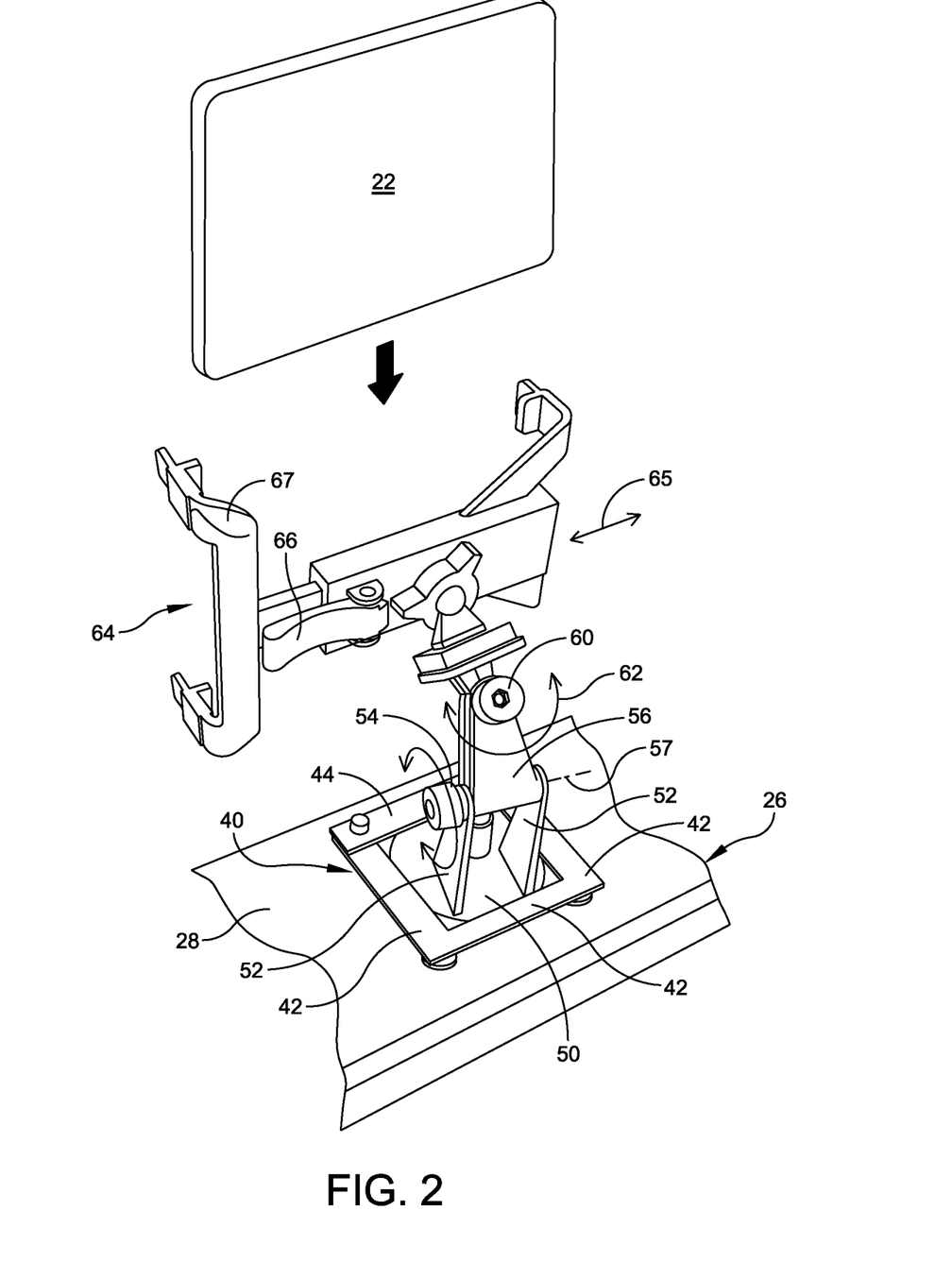
FIG. 2 is a fragmentary view illustrating a portion of the holder and the associated tablet display.

Reference is now made to further details of the detachable tablet holder 20 depicted in FIGS. 2-7. FIG. 2 is a fragmentary view illustrating a portion of the holder and the associated tablet display.

In the embodiments shown, the tablet holder device is shown connected to a stroller, but it should be understood that it may be configured to not only attach to a stroller, but can also attach to any other device such as a wheelchair, a standard chair, a table, stool, desk, and the like.

Figure 3:
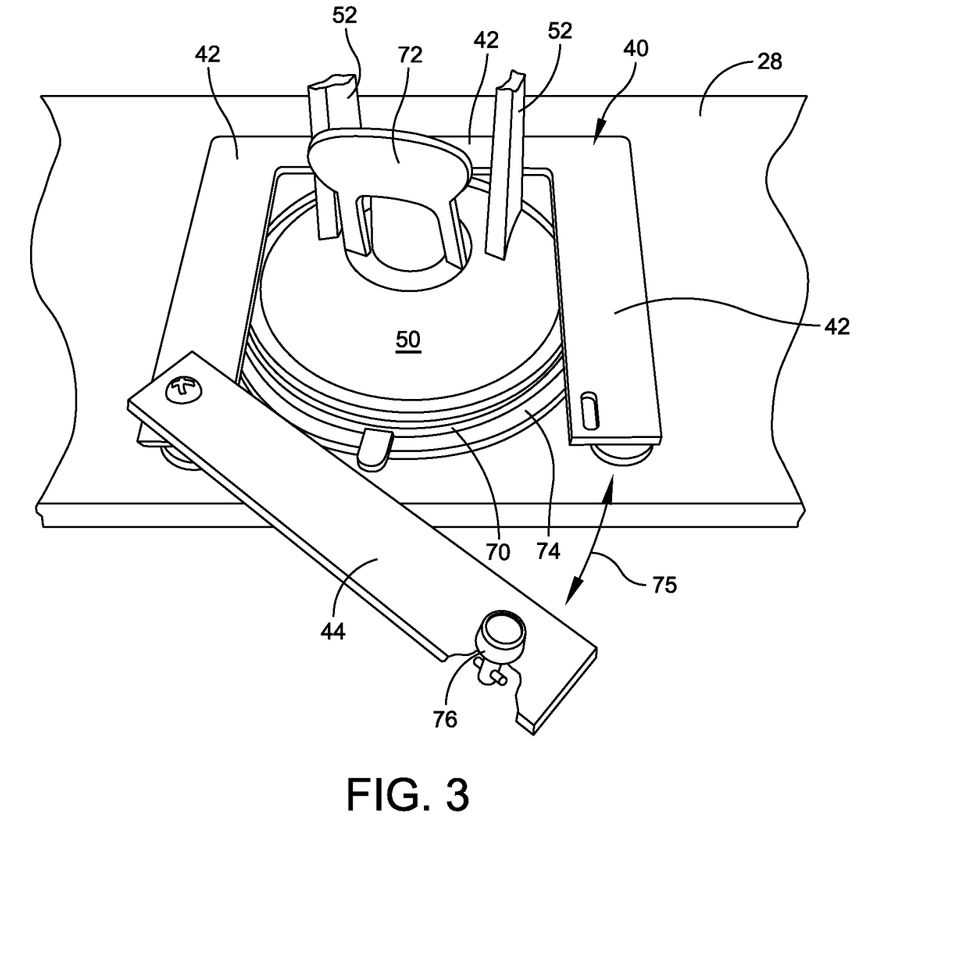
FIG. 3 is a fragmentary view of a portion of the holder.
Figure 4:
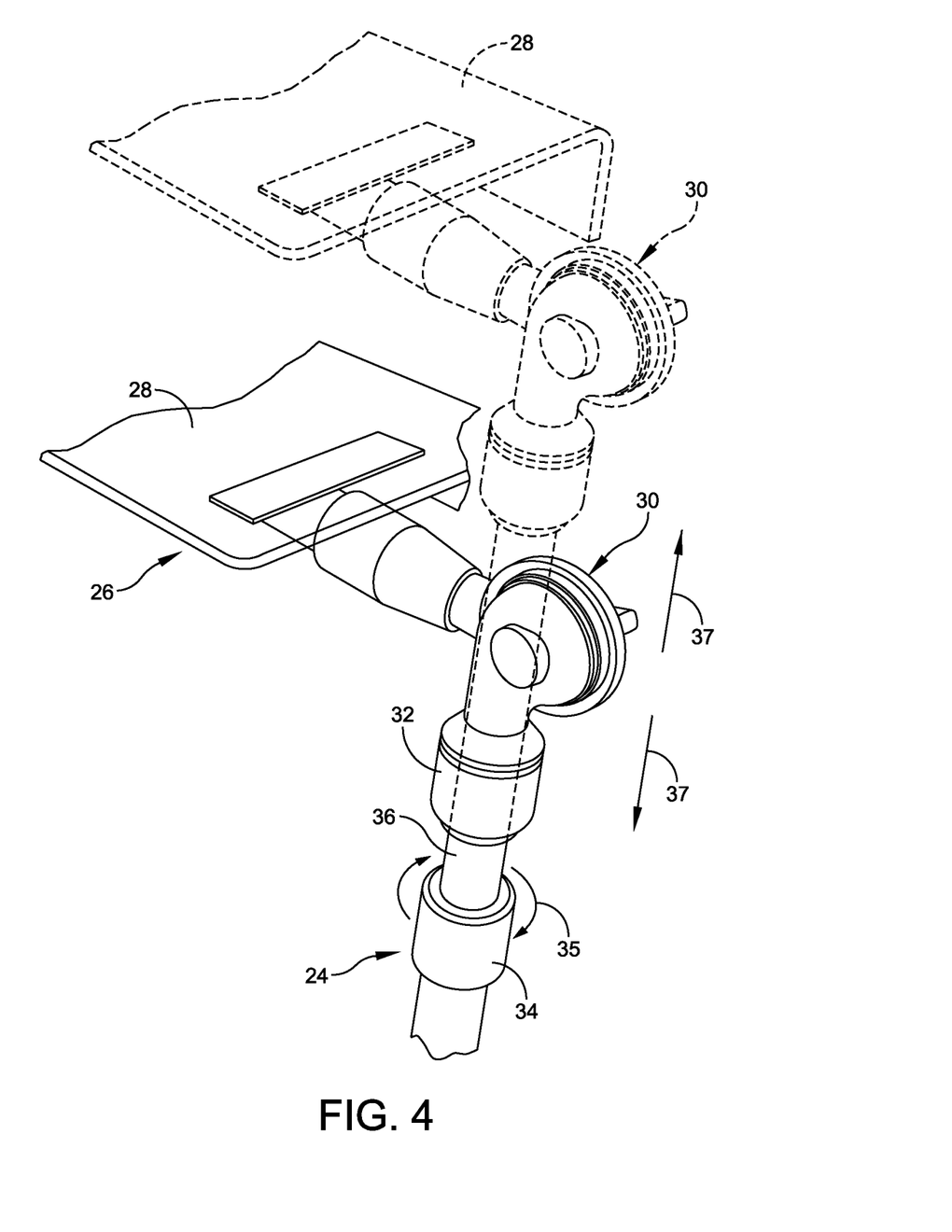
FIG. 4 is a fragmentary perspective view illustrating one of the adjustment features of the apparatus of the present invention.
Figure 5:
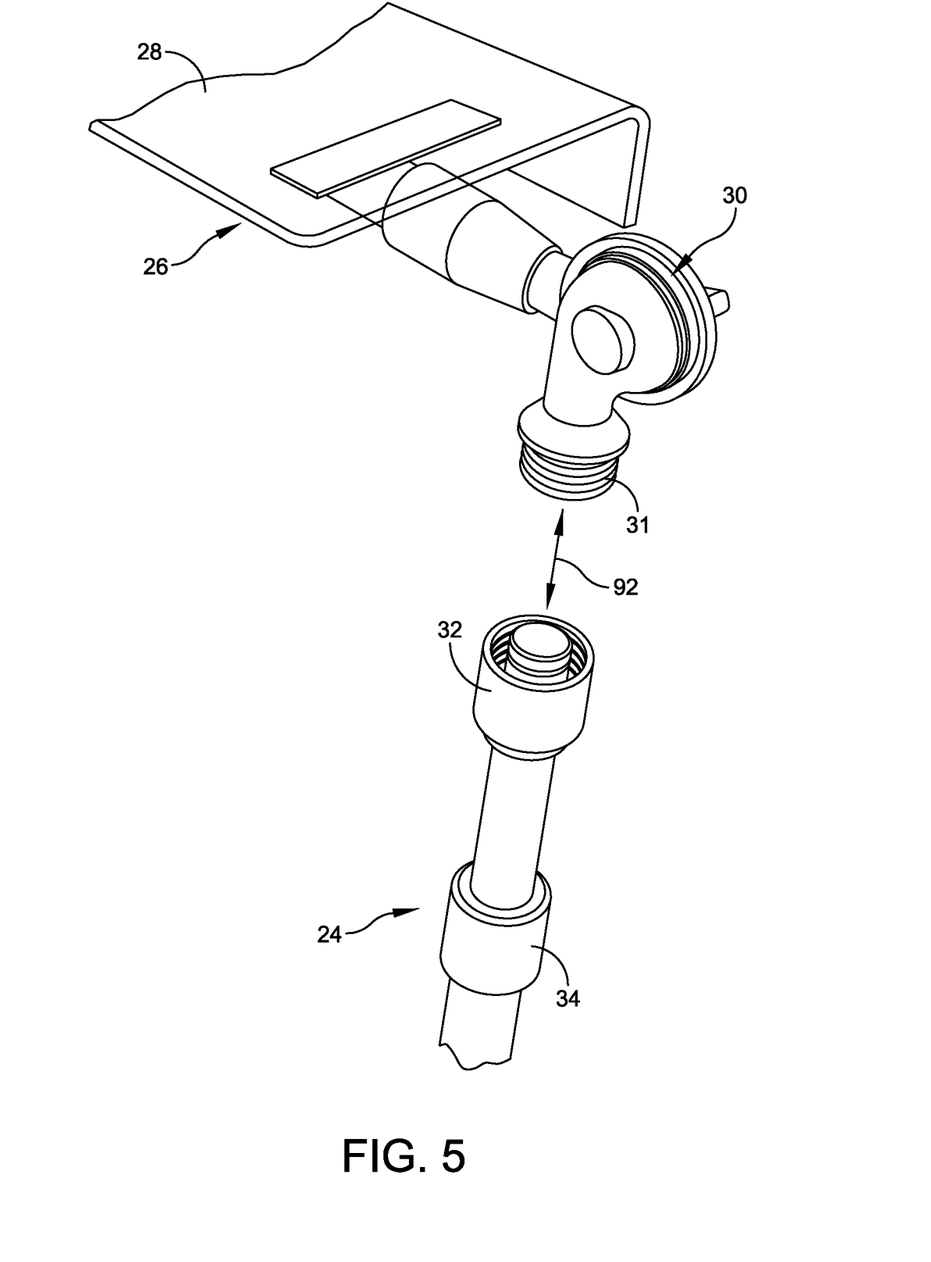
FIG. 5 is a fragmentary exploded view illustrating the manner in which the apparatus may be separated and removed.

Portions of the platform 28 are depicted in FIGS. 2-5. FIGS. 4 and 5, in particular, depict the end of the platform 28 and the connector 30 having an externally threaded base 31 (see FIG. 5). The connector 30 forms an essentially right angle joint connected directly to the platform 28. FIG. 5 also illustrates a top end of the support legs 24 having an internally threaded collar 32 that is free to rotate and removably mate with a threaded section 31 of the connector 30. The height of the support legs 24 may also be adjusted by means of a locking ring 34 that can be rotated in the direction of arrow 35. In this regard, refer to FIG. 4 and the arrows 35. By rotating the ring 34 in one direction or the other, the post 36, a portion of the support legs 24, may be moved up or down for adjusting the overall height of the support legs 24. This height adjustment is illustrated in FIG. 4 by the arrows 37. When the locking ring 34 is rotated in one particular direction, it can lock the post 36 in the particular desired height position.

With further reference to FIGS. 2 and 3, the platform 28 may be affixed at the bottom of upright legs 52 by a mounting member. The mounting member may connect the upright legs 52 and the platform 28. In one embodiment, the mounting member may comprise a suction cup 70. In this embodiment, a frame 40 may comprise of three side pieces 42 fixed to the platform 28, and a pivotal piece 44. The frame 40 is for retaining a base of the suction cup 50 that supports the upright legs 52. As shown in FIG. 2, a second securing knob 54 may be provided at a top of the upright legs 52. The second securing knob 54 can be tightened and loosened to allow pivoting of the plate member 56 about a one pivot axis 57.

Turning now to FIG. 2, a top of the plate member 56 further comprises a securing knob 60 that allows for a manipulation and adjustment of the tablet 22 in the direction of double headed arrow 62. The securing knob 60 may be placed at a pivot point between the support frame 64 and the plate member 56. The plate member 56 connects to a support frame 64. The support frame 64, as depicted in FIG. 2, may be slid in the direction of arrow 65 so that the opening between the opposed sides of the support frame 64 can be changed to accommodate tablets of different length. The support frame 64 may also be provided with a locking lever 66 for locking a one side end 67 of the support frame 64 in a proper position for securely holding the tablet 22 in place.

FIG. 3 illustrates the pivotal piece 44 swung to an open position. This enables the base of the suction cup 50 of the detachable tablet holder 20 to be inserted into the frame 40. To secure the base of the suction cup 50 in place, there may be provided a suction cup 70 that can be operated by means of the lock 72 to force, by a suction action, the suction cup 70 against a flat base piece 74. The pivotal piece 44 may be opened in the direction of arrow 75 and may be locked to one of the side pieces 42 by means of the locking pin 76.

In one embodiment, an aperture may be formed on one of the side pieces 42. The aperture may be placed to receive the locking pin 76, thereby securing the pivotal piece 44 from opening when received. In a further embodiment, the aperture may have an elongated shape. A bar may protrude out transversely at the end of the locking pin 76 where the bar is sized to fit through the aperture. The locking pin 76 may be rotated to align the bar with the aperture having the elongated shape, thereby allowing the locking pin 76 to escape out of the aperture. On the other hand, the pivotal piece 44 may be at a locked position, when the locking pin 76 is received by the aperture and rotated further to misalign the bar about the aperture.

As indicated previously, the detachable tablet holder 20 apparatus of the present invention includes fixed but pivotal support legs 24. Reference may now be made to further fragmentary views of FIGS. 6 and 7 showing the base of the support legs 24. FIG. 6 illustrates the support legs 24 in a locked upright position, while FIG. 7 shows the support legs 24 disengaged and pivoted to a stowed position wherein the support legs 24 extends substantially alongside of the stroller rails 18. The arrow 77 in FIG. 7 illustrates the direction of pivoting. The support legs 24 include a base end 80 and a pivot arm 82. FIGS. 6 and 7 also illustrate a pivot stop 84. The pivot stop 84, as illustrated in FIG. 6, has a pad 85 that engages the base 80 and a disengageable pad 86 that is locked under the pivot arm 82. The pivot arm 82 may be attached to the rail 80 at a pivot location 87. The pivot stop 84 is supported in a pivotal manner at 88. There is also included a slide ring 89 attached to the pivot arm 82. In FIG. 6 the slide ring 89 is shown at its uppermost position with the pivot arm 82 pivoted and locked in position so that the support legs 24 are in an upright position such as the position illustrated also in FIG. 1.

In order to pivot the support legs 24 to a downward position, reference may now be made to FIG. 7. For that purpose, the pad 86 may be screwed down so as to disengage from the pivot arm 82 allowing the pivot arm 82 to pivot. This causes the slide ring 89 to slide along the base 80 to its lowermost position as illustrated in FIG. 7. This pivoting action in the direction of arrow 77 stows the support legs 24 to a position directly adjacent to the stroller rail 18. The adjustment illustrated in FIGS. 6 and 7 can be made with respect to both of the oppositely disposed support legs 24 which are meant to be supported in the same position depending upon whether in the operative position or in the stowed position.

FIG. 5, in particular, illustrates the manner in which the platform 28 of the detachable tablet holder 20 may be disengaged from the support legs 24. This disengagement is illustrated by means of the arrow 92 in FIG. 5. The removable portion 26 may then be totally removed on both sides of the platform 28 so that access is had to the seated area of the stroller 10. This enables the child to be seated or removed from the seated area. After the child is in place, then the platform 28 may be secured at the support legs 24 such as in the position illustrated in FIG. 4. Adjustment and height of the platform 28 is possible by means of the locking ring 34 rotated in the direction of arrow 35 as depicted in FIG. 4.

Turning back to FIG. 2, an embodiment describing an assembly of the tablet 22 and the support frame 64 is shown. The tablet 22 may comprise a left edge, a right edge opposite to the left edge, a front face, and a back face opposite to the front face. In one embodiment, the support frame 64 may comprise the one side end 67 contacting the tablet 22 at an upper portion of the left edge, forming a first end structure. The one side end may be urged against the upper portion of the left edge when the support frame 64 is at a fixed position. The one side end may further contact the tablet 22 at a lower portion of the left edge, forming a second end structure, which may be urged against the one side end 67 when the support frame 64 is at the fixed position. The first end structure and the second end structure may further extend towards the right edge over the front face, forming L-shape end structures, which may prevent the tablet 22 from escaping away from the support frame 64.

In another embodiment, the support frame 64 may comprise an arm extending from the back of the support frame 64 away from the one side end 67 and towards the right edge. The arm may contact the right edge, forming a third end structure, which may be urged against the right edge when the support frame 64 is at the fixed position. The third end structures may further extend towards the left edge over the front face, causing the plurality of third end structures to appear L-shape, which may prevent the tablet 22 from escaping away from the support frame 64.

Figure 8:
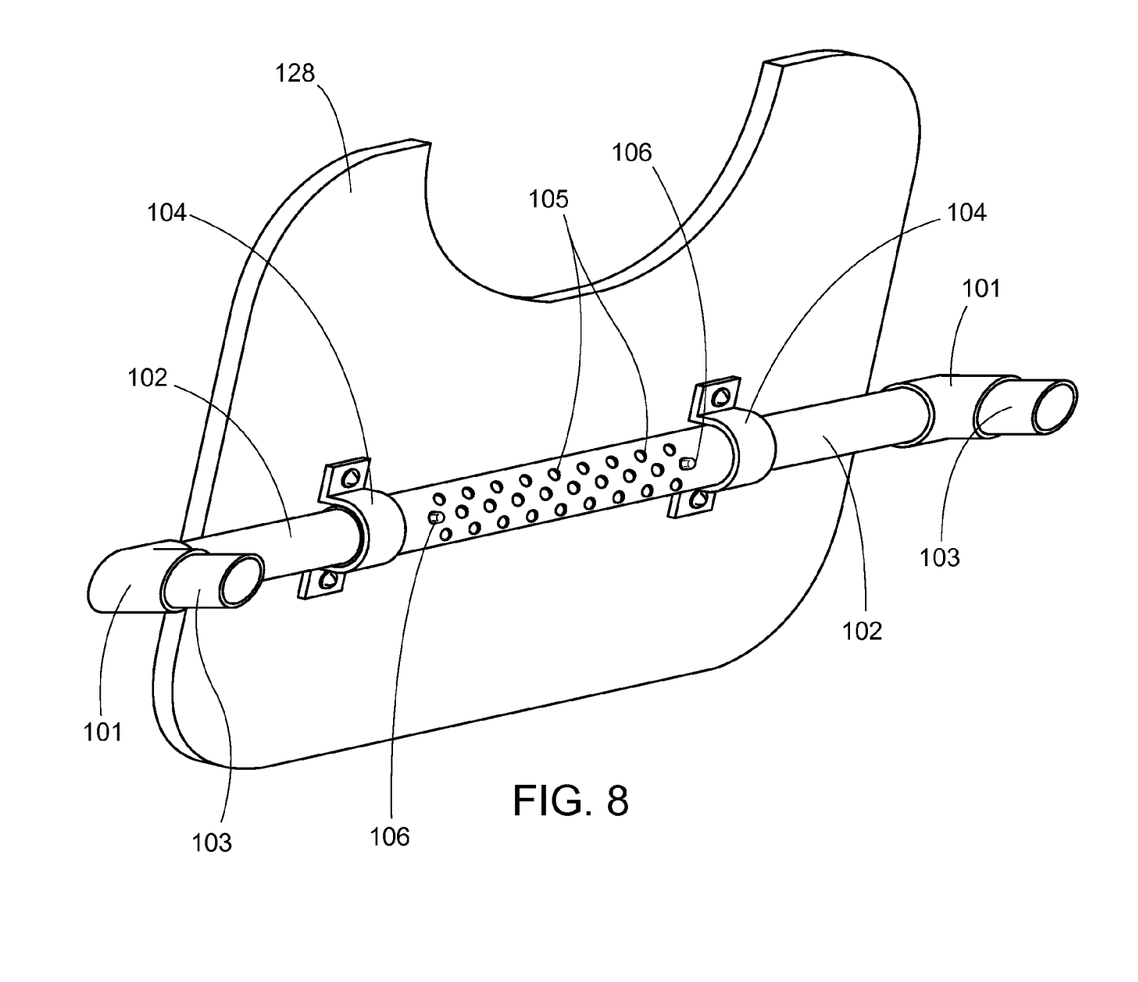
FIG. 8 is a fragmentary view of a portion of another embodiment of the holder.

Turning now to FIG. 8 a view of an underside of an embodiment of a platform 128 is provided. The platform is connected to support legs 103 by 90 degree connectors 101 (or similar angled joint connector) to cross-bar 102. Cross bar supports the platform 128 to whatever the platform is connected to. A pair of U-joints 104 may connect cross-bar 102 directly to the platform 128, though it should be understood that any connection may be employed. Cross-bar 102 is shown here as a two part bar slideably inserted into a central tube. This central tube comprises a plurality of apertures 105—in this case, three rows of non-aligned apertures 105. Spring loaded pins 106 extend from each side end of the cross bars 102. These pins 106 are configured to engage with the apertures 105 at varying positions, to allow support legs 103 to be angled and spaced to a variety of positions. As such, the support legs may be parallel or not, may be positioned at the same lateral position, or not, and further, this configuration allows platform 128 to have its angle adjusted forward or backward, depending on desired configuration. In this embodiment, the tablet holder support legs 102 may be configured to not only attach to a stroller, but can also attach to any other device such as a wheelchair, a standard chair, a table, stool, desk, and the like.

Figure 9:
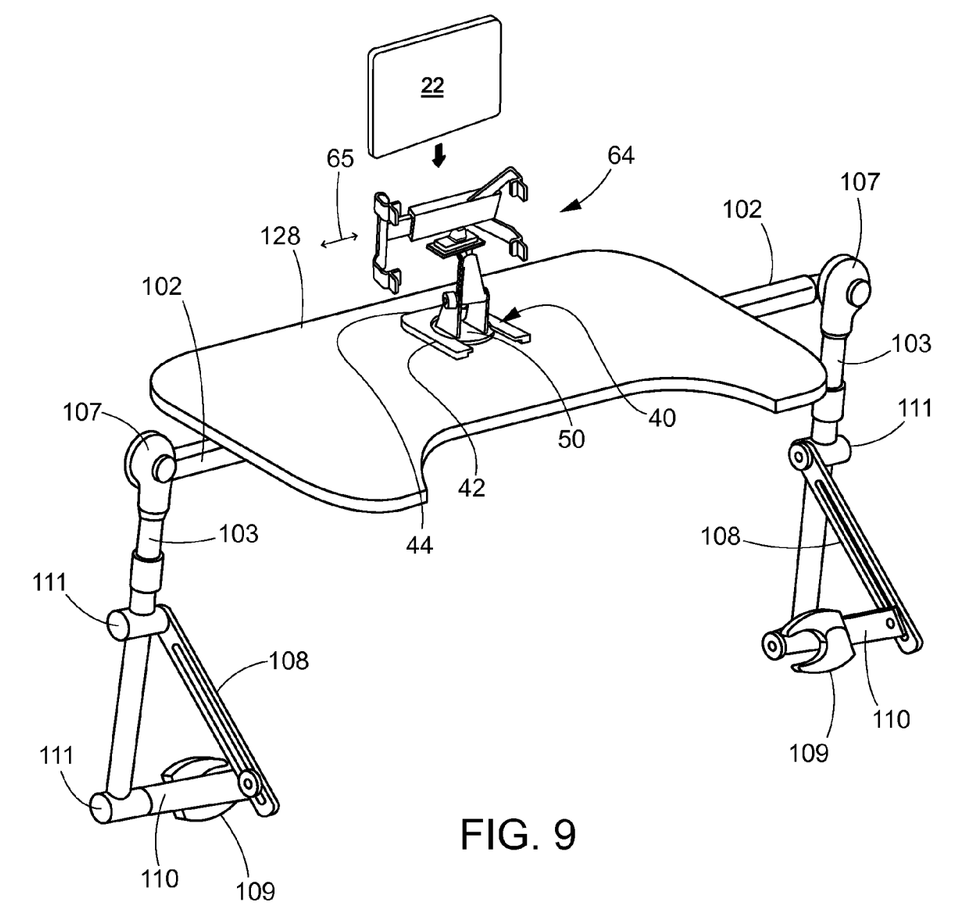
FIG. 9 is a perspective of an embodiment of the tablet computer holder configured to attach to various devices.
Figure 10:
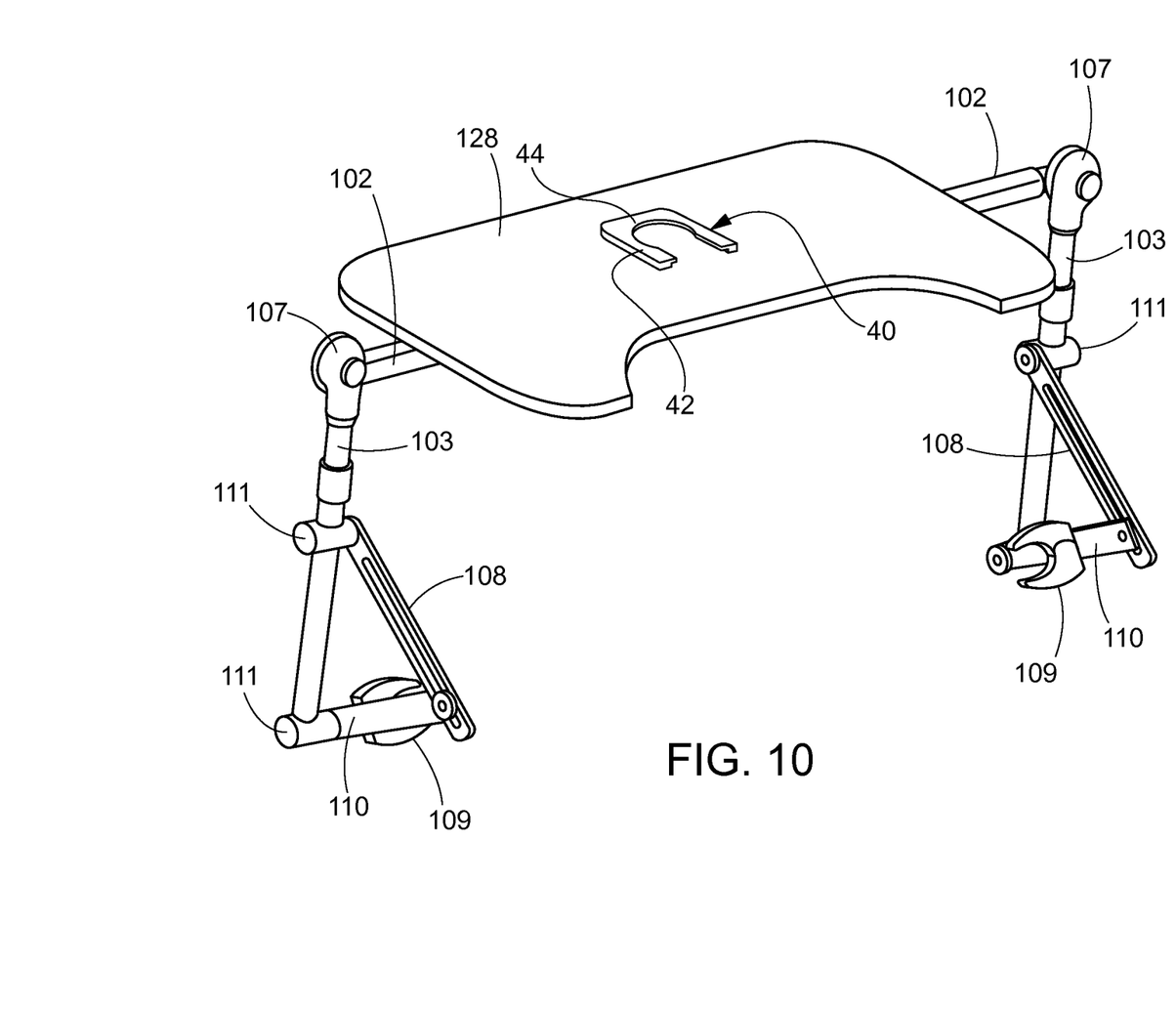
FIG. 10 is a fragmentary view of a portion of another embodiment of the holder.
Figure 11:
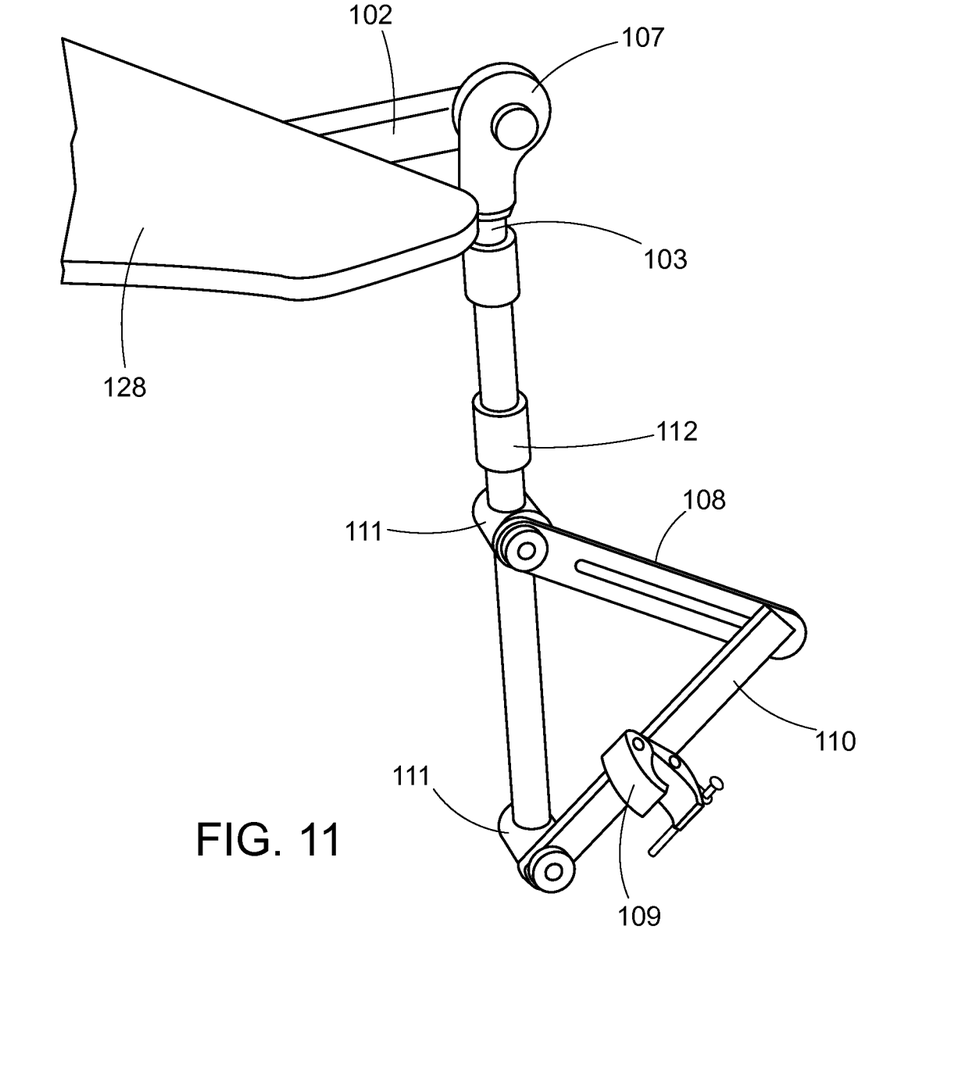
FIG. 11 is a fragmentary view of a portion of another embodiment of the holder.

FIGS. 9, 10 and 11, show another embodiment of the tablet holder. This embodiment is configured to attach not only to a stroller but to any other device, including, but not limited to a wheelchair, a standard chair, a table, stool, desk, and the like. Platform 128 has cross-bar or bars 102 connected to its bottom. It should be understood that in some embodiments, the underside of platform 128 may be configured as shown in FIG. 8. Cross bars 102 are connected at each end to joint 107. Which may be adjustable to change the angle between cross bar 102 and support leg 103. A connector assembly is comprised of a slideable and pivotable connector 111. A slide bar 108 connects bar 110 to another connector 111, creating a triangular and adjustable base for connector 109. Slide bar 108 comprises a channel along its length with a peg movable along the channel. This peg is connected to bar 110 which is pivotally connected to leg 103 via connector 111. As such, clamp connector 109 may be moved and rotated to any number of different positions and orientations allowing for its connection to many different surfaces or structures. It should be understood that platform 128, in most embodiments may further comprise the tablet and connector structure as discussed above and shown in FIG. 2, 3, and other figures.

Further shown in FIG. 9 is the platform 128 having a generally U shaped receiving slot formed as a protrusion from the top face of the platform, having a reduced diameter through a channel, and increased diameter at the receiving section. The channel is configured to slideably receive the frame, such that the frame is removable by sliding out of the channel, and held securely in place when within the channel. This structure allows the frame and its connected structure to be removable from the platform, and securely attachable to the platform. The receiving slot further comprises two portions along its height, the first portion having a width large enough to receive the frame, and the second portion above the first portion having a width smaller than the width of the frame, such that the frame cannot pass upward through the channel, and can only slide outward on the open end of the U-shaped channel.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A detachable tablet holder, comprising:
   a support frame configurable to receive a tablet, wherein a one side end of the support frame being slidable along a width of the support frame, the support frame sized to fit along an outer perimeter of the tablet, holding the tablet in place when the support frame is at a fixed position, the support frame having a locking lever formed at a back of the support frame, the support frame coming to the fixed position when the locking lever is engaged;
   a plate member pivotally mounted at the back of the support frame, and a securing knob placed at a pivot point between the support frame and the plate member, the securing knob capable of providing a force to tighten the support frame and the plate member in place;
   a plurality of upright legs pivotally attached at a bottom of the plate member, wherein the plate member pivoting about an one pivot axis, the one pivot axis extending perpendicular to each of the plurality of upright legs allowing each of the plurality of upright legs to pivot back and front;
   a platform affixed at a bottom of each of the plurality of upright legs by a frame, the platform providing a support for the tablet and connecting structure and providing a flat surface, the platform comprising a receiving slot, the receiving slot comprising a protrusion defining a channel configured to slideably receive the frame, such that the frame is removable by sliding out of the channel, and held securely in place when within the channel;

two cross bars slideably attached to a tube, the tube connected to the platform, each of the two cross bars having a spring loaded pin extending axially from an end of the cross bar, the pin of each of the two cross bars extending through one of a plurality of apertures formed in the tube, the plurality of apertures arranged in a plurality of rows along the length of the tube, at least one of the rows of apertures being offset from the remainder of the plurality of rows, wherein each of the cross bars may be positioned into any of the plurality of apertures of the tube providing a plurality of lengthwise and rotational orientations to the two cross bars;

one support leg connected to each one of the two cross bars by a connector, each of the support legs being extendable along its length and retractable; and a connector assembly connected to each support leg, the connector assembly comprising two slideable and rotatable connectors connected to the support leg;

a slide bar extending from one of the slideable and rotatable connectors, the slide bar defining a channel, and having a peg slideable within the channel;

a connector bar connected to the peg at one end, and to the other of the two slideable and rotatable connectors at an opposite end; and a clamp connector connected to connector bar.

* * * * *